United States Patent [19]

Gamaldi

[11] Patent Number: 5,193,882
[45] Date of Patent: Mar. 16, 1993

[54] MECHANISM FOR RAISING AND TILTING A CONTAINER FOR DISCHARGE PURPOSES

[76] Inventor: Paul M. Gamaldi, 5100 Valley East Blvd., Arcata, Calif. 95521

[21] Appl. No.: 769,314

[22] Filed: Oct. 1, 1991

[51] Int. Cl.$^5$ ............................................. B60P 1/34
[52] U.S. Cl. .............................. 298/11; 298/23 DF; 414/553; 414/917
[58] Field of Search ....................... 298/6, 11, 23 DF; 414/421, 553, 917

[56] References Cited

U.S. PATENT DOCUMENTS

| | | | |
|---|---|---|---|
| 1,024,959 | 4/1912 | Wolf | 298/6 |
| 4,647,267 | 3/1987 | Hund, Jr. | 414/408 |
| 4,669,940 | 6/1987 | Englehardt et al. | 414/303 |
| 4,673,327 | 6/1987 | Knapp | 414/408 |
| 4,699,557 | 10/1987 | Barnes | 414/408 |
| 4,710,087 | 12/1987 | Naaktgeboren et al. | 414/44 |
| 4,746,254 | 5/1988 | Langenfeld et al. | 414/703 |
| 4,793,462 | 12/1988 | McFall | 198/365 |
| 4,836,610 | 6/1989 | Doering et al. | 298/6 |
| 4,989,917 | 2/1991 | Schmidt, Jr. | 298/11 |

FOREIGN PATENT DOCUMENTS

| | | | |
|---|---|---|---|
| 1306498 | 4/1987 | U.S.S.R. | 414/553 |
| 968570 | 9/1964 | United Kingdom | 298/11 |

Primary Examiner—David A. Bucci
Assistant Examiner—Janice Krizek
Attorney, Agent, or Firm—Foley & Lardner

[57] ABSTRACT

In a portable unit having a generally horizontal frame, a container normally resting on the frame and pivotally connected at its rear of the frame for tilting upwardly and rearwardly toward a dumped position, the container having a door at its rear for loading and unloading material for opening when the container is in a dumped position, the improvement being a lift-and-tilt mechanism including a linkage pivotally connected at one end to the frame, and with a subframe unit interposed between the container and unit frame to support the container, with an inner end of the subframe unit pivotally connected to the linkage unit at an opposite end, whereby the linkage and subframe units are movable from a nested position substantially flat with the unit frame to a raised position with the linkage unit disposed substantially vertical, and with the subframe unit holding the container in a normally horizontal position, and with the container tiltable to its dumped position; and a power-operated unit for moving the linkage unit from its nested position to its raised position; a lift arm unit connected between the linkage unit and the subframe unit and engaged with the underside of the container for automatically tilting the container toward a dumped position upon raising of the linkage and subframe units; and a strap unit interconnected between the container door and the linkage unit for automatically pivotally opening the door upon the container being tilted upwardly and rearwardly to its dumped position.

12 Claims, 8 Drawing Sheets

MECHANISM FOR RAISING AND TILTING A CONTAINER FOR DISCHARGE PURPOSES

TECHNICAL FIELD

The present invention relates to the discharging of material from containers in general, and in particular to grass clippings and leaf holding containers with a rear-mounted door held on the frame of a riding lawn mower, which container is tiltable from front-to-rear.

BACKGROUND ART

A box-like container is mounted on the rear framework of a portable machine such as a riding lawn mower. Grass clippings, leaves and other like debris are loaded into the normally horizontally disposed container. The container includes a rear door which may be pivotally swung open from the top. With the door open, the container may be normally tilted on the mower frame from front-to-rear such that any material therein will slide outwardly and downwardly.

The utilization of this type container discharge arrangement is restricted in that the discharge of material is either onto a ground or like surface or is into another container for transportation purposes which is no higher than the lower edge of the rear of the container.

It is to a removal of such limitations on the utilization of such a container arrangement that this invention is directed, with a result that not only greatly enhances such utilization, but which also reduces the manual labor to a minimum by allowing for a novel automatic raising and tilting movement of the container during which the container discharge door is opened.

DISCLOSURE OF THE INVENTION

In a portable unit having a generally horizontal frame, a container normally resting on the frame and pivotally connected at its rear of the frame for tilting upwardly and rearwardly toward a dumped position, the container having a door at its rear for unloading material therefrom, the invention being a lift-and-tilt mechanism which comprises a linkage means pivotally connected at one end to the frame, and with a subframe unit interposed between the container and vehicle frame to support the container, with an inner end of the subframe unit pivotally connected to the linkage unit at an opposite end, whereby the linkage and subframe units are movable from a nested position substantially horizontal with the unit frame to a raised position with the linkage unit disposed substantially vertical, and with the subframe unit holding the container in a normally horizontal position, and with the container tiltable to its dumped position: the invention comprising further one or more options including a power-operated unit for moving the linkage unit from its nested position to its raised position; a lift arm unit connected between the linkage unit and the subframe unit and engaged with the underside of the container for automatically tilting the container toward a dumped position upon raising of the linkage and subframe units; and even further a strap unit interconnected between the container door and the linkage unit for automatically pivotally opening the door upon the container being tilted upwardly and rearwardly to its dumped position.

An object of this invention is to provide a new and novel mechanism for discharging material from within a rear opening container normally held in a horizontal position on a frame.

Another object of this invention is to provide a new and novel mechanism for elevating such a container during the discharging process.

Yet another object of this invention is to provide an improved mechanism for simultaneously elevating and tilting such a container during the discharging process.

Still another object of this invention is to provide such an improved mechanism for a conventional portable riding mowing machine with but a minimum alteration of the frame of the mower.

Another object of this invention is to utilize the conventional mower frame and container wherein the improved lift-and-tilt mechanism is interposed between the container and mower frame while but slightly raising the elevation of the container when in its normally lowered position.

Still another object of this invention is to provide such a lift-and-tilt mechanism which can be operated manually, by springs, pneumatically, electrically or hydraulically or any combination thereof with but a minimum of alteration.

Yet another object of this invention is to provide a new and novel mechanism for simultaneously elevating the container, tilting the container from front-to-back for a rear unloading, and opening the container's rear door for discharging material therein at an elevated position.

BRIEF DESCRIPTION OF THE DRAWINGS

These and other attributes of the invention will become more clear upon a thorough study of the following description of a preferred embodiment of the invention, particularly when reviewed in conjunction with the accompanying drawings, wherein.

DETAILED DESCRIPTION OF PREFERRED EMBODIMENT

Figure 1:
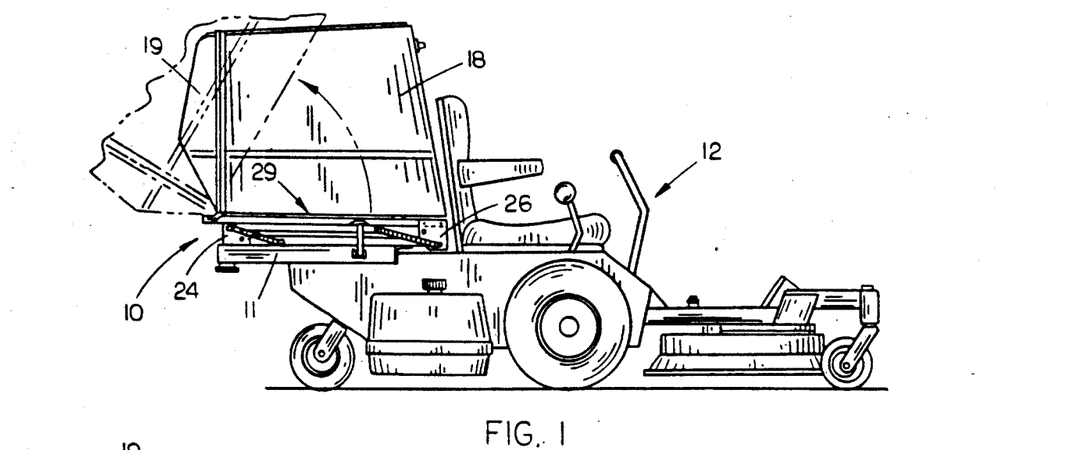
FIG. 1 is a side elevational view of one embodiment of this invention as assembled to a riding lawn mower.

Referring now to the drawings, the lift-and-tilt mechanism of this invention is indicated generally at (10) in FIG. 1 and is shown mounted in a nested, relatively horizontal position on the rear frame (11) of a riding lawn mower (12). The mower (12) is conventional, having a front, mowing table (13) carried by the mower main frame (14) supported on a pair of wheels (16) and a rear, pivotal wheel (17). A box-like container (18) of a molded lightweight plastic for example, and having a rear door (19) pivoted at its upper end (21) to the upper rear end (22) of the container (18), though normally secured to the mower rear frame (11), is mounted on the mechanism (10).

Figure 2:
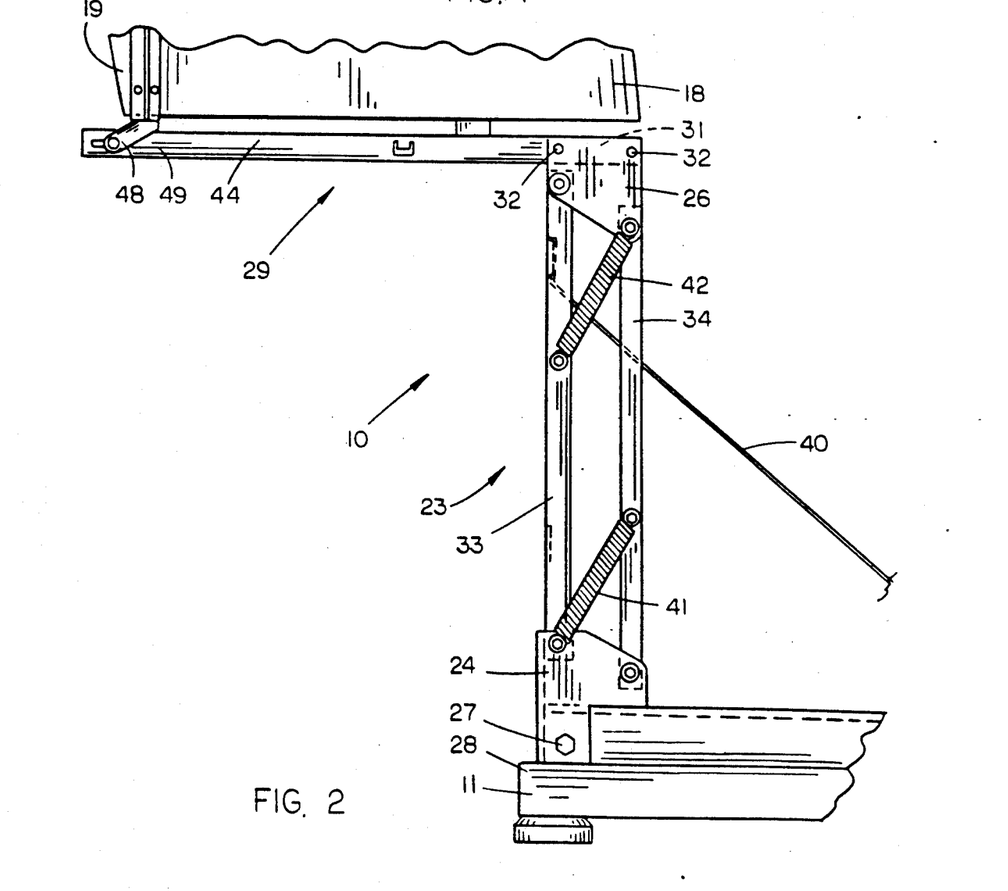
FIG. 2 is an enlarged side elevational view of the linkage mechanism for lifting the container above the mower frame.

The lift-and-tilt mechanism comprises a pair of transversely spaced, parallel linkage units (23) (FIGS. 2 and 5) each having at opposed ends channel-shaped brackets (24), (26), the rear bracket (24) of each unit (23) of which is connected as by a fastener (27) to the rear end (28) of the rear frame (11), and comprises further a right angular subframe unit (29) (FIG. 4) which supports the container (18) at all times in a generally horizontal position due to linkage units (23) arrangement, the inner ends (31) of the subframe unit (29) secured in a stable, cantilever manner as by fasteners (32) to the opposite, front bracket (26) of each linkage unit (23). It will be noted that the linkage units (23) are identical.

Figure 5:
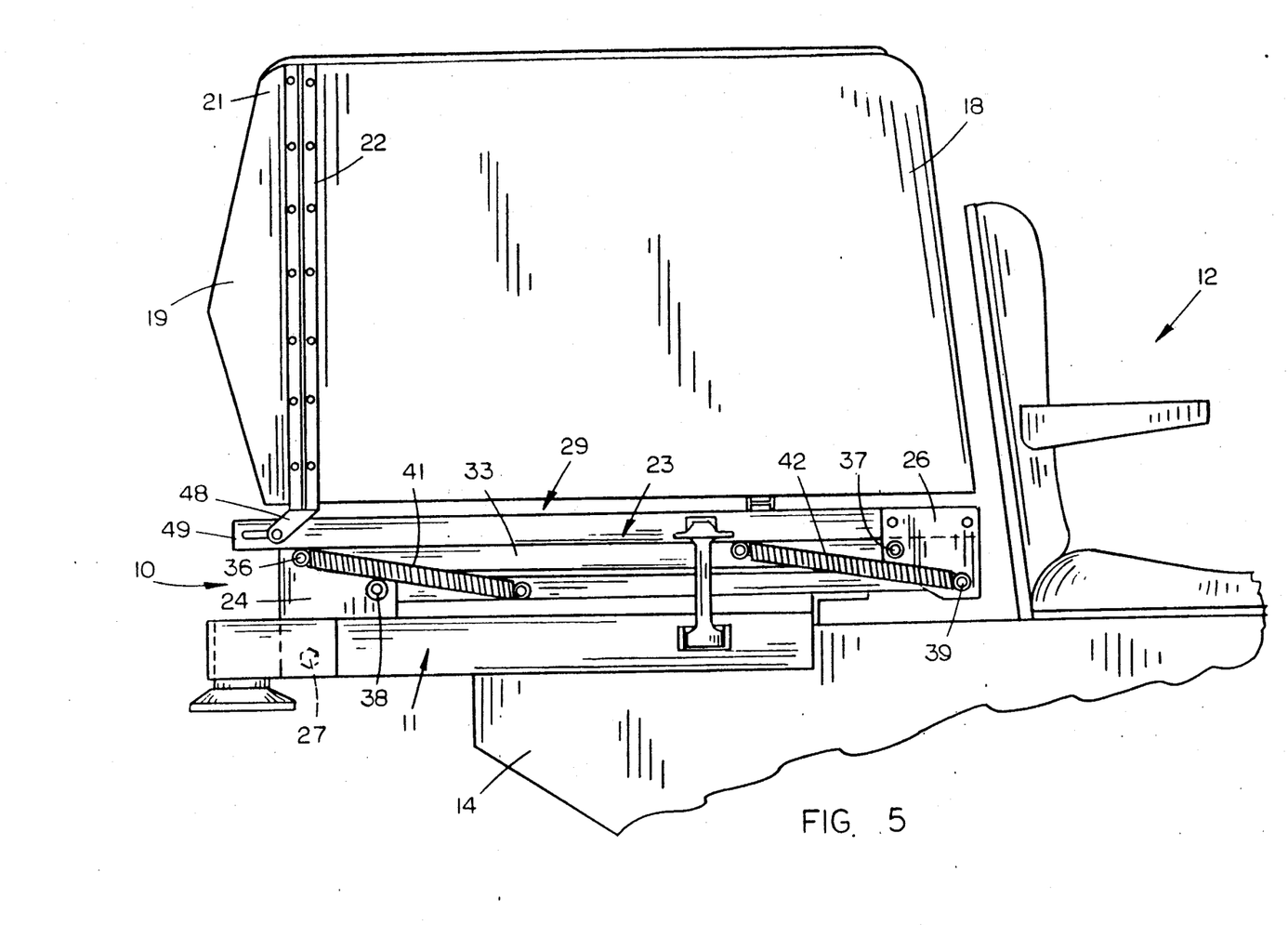
FIG. 5 is an enlarged side elevational view of the linkage mechanism in its nested position.
Figure 6:
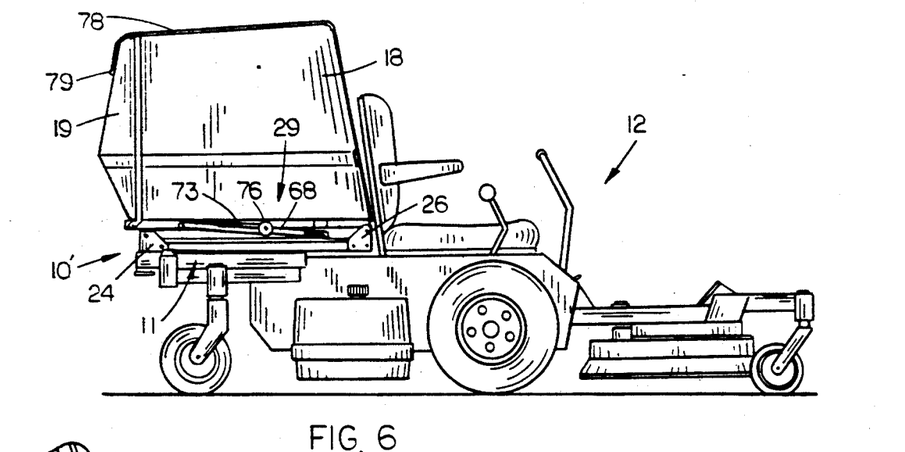
FIG. 6 is a view similar to FIG. 1 of another embodiment of the invention.

More particularly, each linkage unit (23) comprises an upper link (33) (FIG. 5) and a lower link (34), the links (33), (34) being of equal length. The upper link (33) is pivotally connected by fasteners (36), (37) to and extended between the brackets (24), (26); and the lower link (34) is pivotally connected by fasteners (38), (39) to and extended between the brackets (24), (26) in an offset but parallel arrangement as best shown in FIG. 5. A pair of springs (41), (42) e.g., either steel or pneumatic are connected between the links (33), (34) also in a parallel, longitudinally spaced manner to bias the links (33), (34) in a lowered, nested position slightly above the mower rear frame (11) (FIG. 5).

Figure 4:
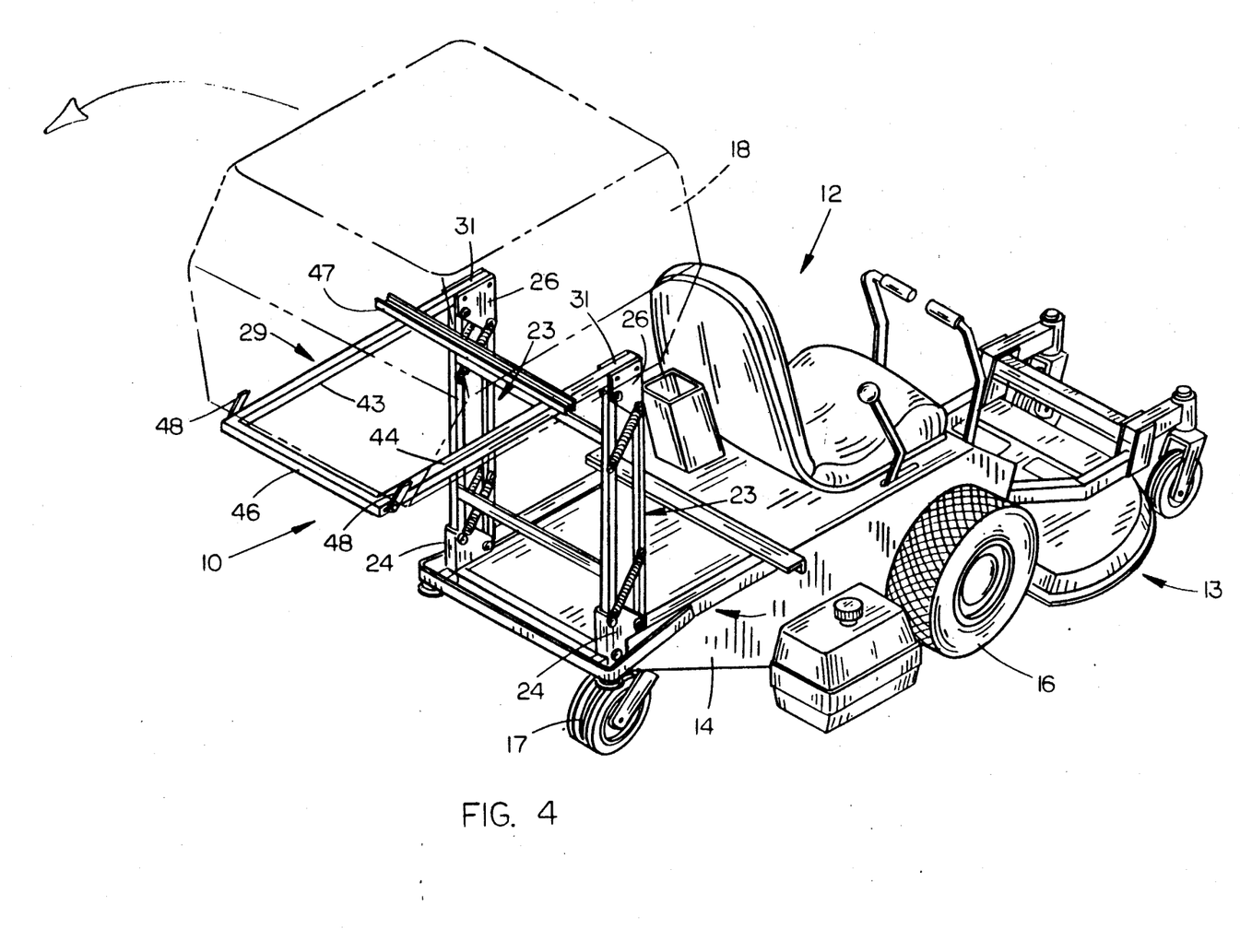
FIG. 4 is a perspective view.

The subframe unit (29) comprises a pair of rearwardly extended arms (43), (44) joined to form a right angular frame by a transverse member (46) (FIG. 4). The container (18) rests upon the arms (43), (44), the member (46), and another cross member (47) (FIG. 4) secured across the arms (43), (44) rearwardly of the member (46), and is pivotally connected by struts (48) to the rear ends (49) of the arms (43), (44) for an upward and rearward tilting movement.

Figure 3:
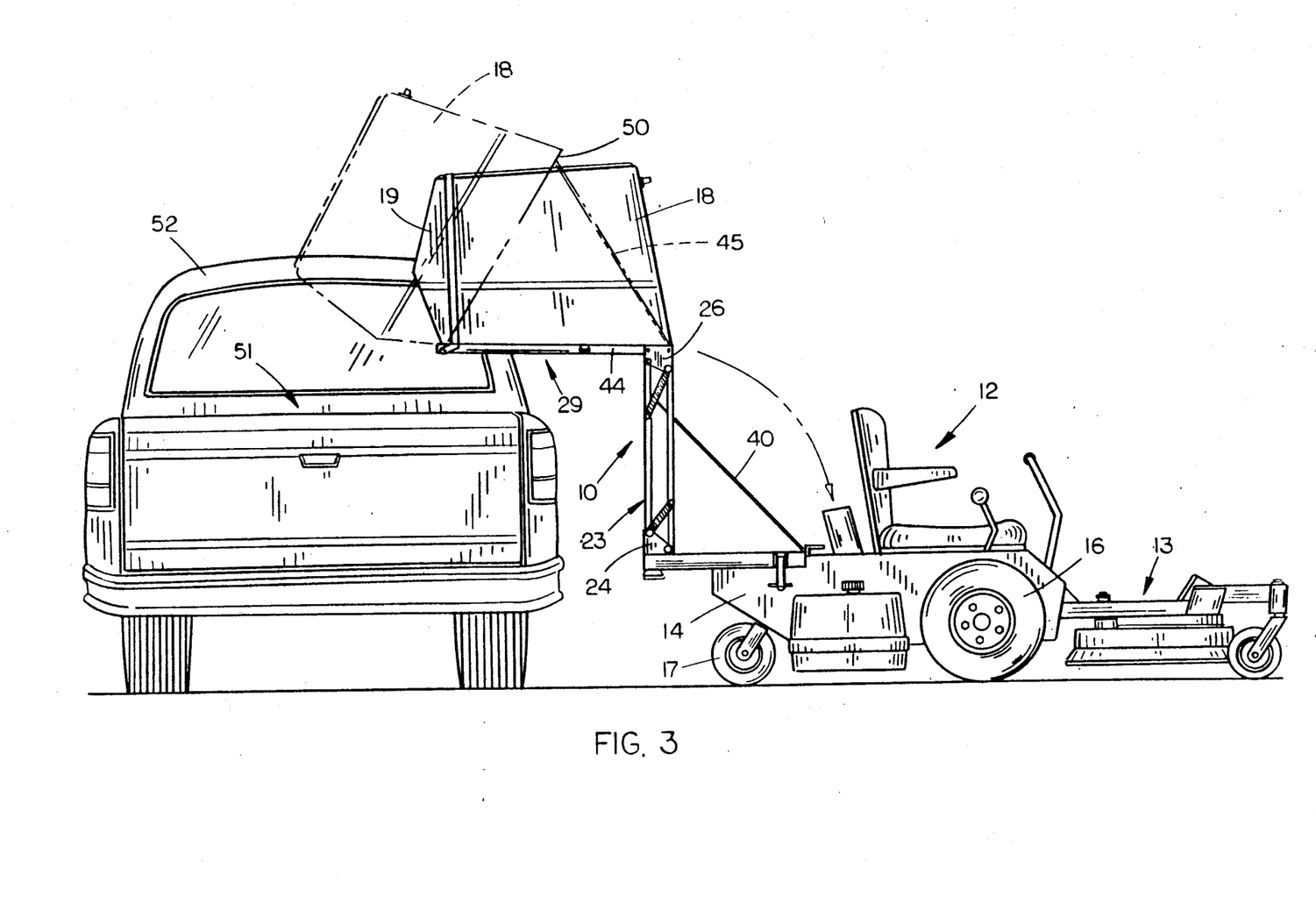
FIG. 3 is a side elevational view similar to FIG. 1 and showing a raised container tilted for discharge into a pickup.

By this arrangement, upon the container (18) being loaded and ready for discharge, the lift-and-tilt mechanism (10) may be lifted from the front about the rear bracket (24) from the nested position to a raised position with the linkage units (23) in a substantially vertical position. Due to the parallel linkage arrangement, the subframe unit (29) and the container (18) are maintained in a substantially horizontal position, and when raised, the door (19) may be pivoted to an open position and the container (18) tilted upwardly by any means, as indicated in FIG. 3 for dumping or otherwise discharging any material therein into the bed (51) of a pickup truck (52), or like portable container for transport.

To achieve a stability of the raised conditions, a support (40) may be removably inserted between the frame (11) and one or both units (23), and another support (45) may be removably inserted between one or both units (23) at their upper ends (FIG. 3) and a rear portion (50) of the container (18).

Referring now particularly to FIGS. 6 through 9, a second embodiment is depicted showing a fully automated mechanism (10'), all components identical with the first embodiment (10) indicated by like reference numerals. The mower rear frame (11) is strengthened by the provision of a U-shaped support (53) (FIG. 9) consisting of a central member (54) secured as a part of the frame (11), with outwardly extended wings (56) and bosses (58), all providing additional support for the increased weight of the container (18).

To provide for an automatic raising of the linkage units (23) and of course the subframe unit (29) all as one assembly, a hydraulic piston and cylinder device (59) (FIG. 7) is interposed between a cross member (61) secured transversely between the lower links (34) (FIG. 9) and a tongue device (62) connected to another cross member (63) of the mower main frame (14). The device (59) may be powered from any source as a part of or added to the mower (12) in any conventional manner. Thus, operation of the piston and cylinder device (59), as with a manual raising of the linkage units (23) effects a rotating of the lift-and-tilt mechanism (10') from its normally horizontal nested position (FIG. 6) to a raised position with the linkage units (23) generally vertical and with the subframe unit (29) generally horizontal and holding the container likewise. It is envisioned that the device (59) may also be of a pneumatic or electrical nature.

Figure 7:
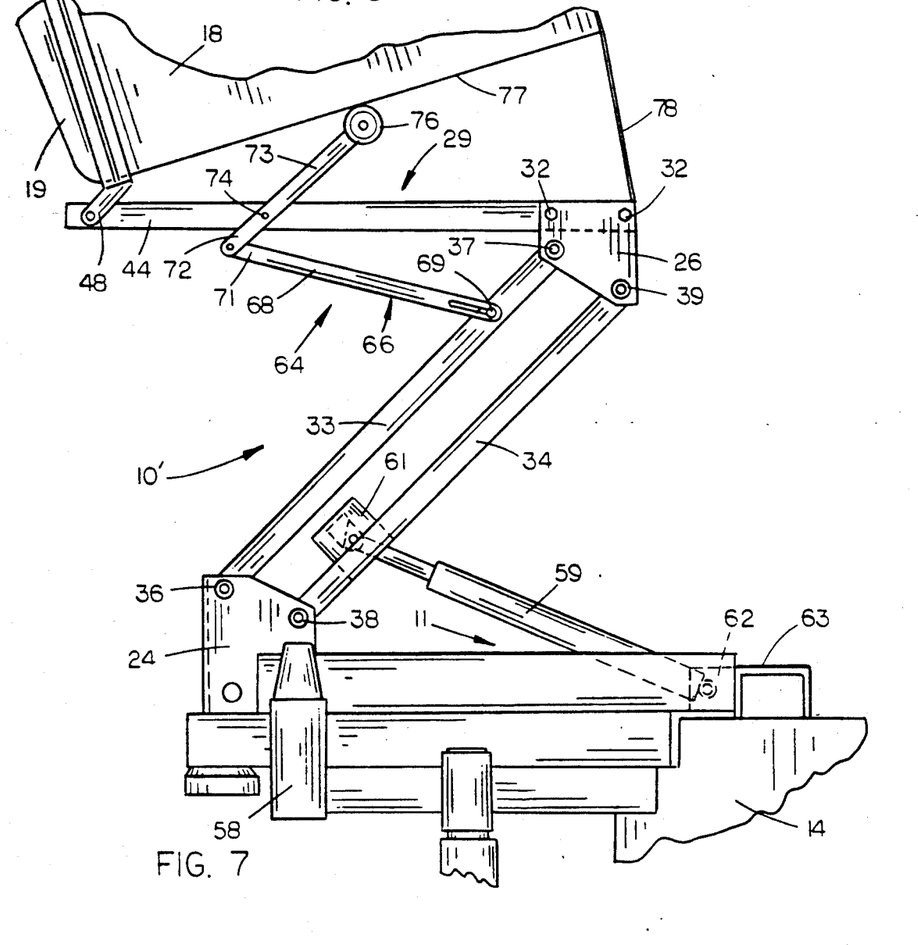
FIG. 7 is an enlarged side elevational view showing a lifting and tilting mechanism of FIG. 6 for the container.
Figure 8:
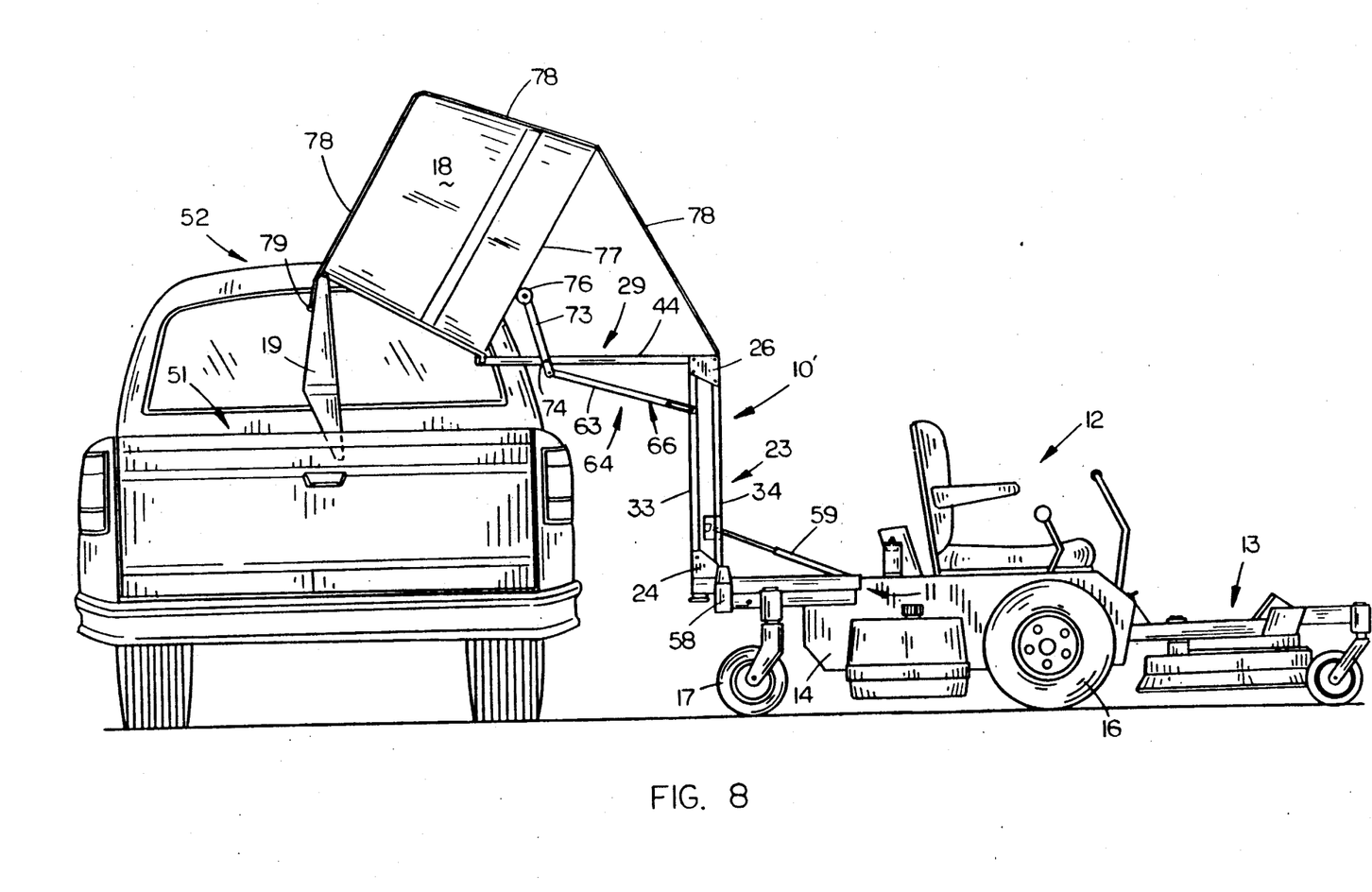
FIG. 8 is a view similar to FIG. 3 of the second embodiment.
Figure 9:
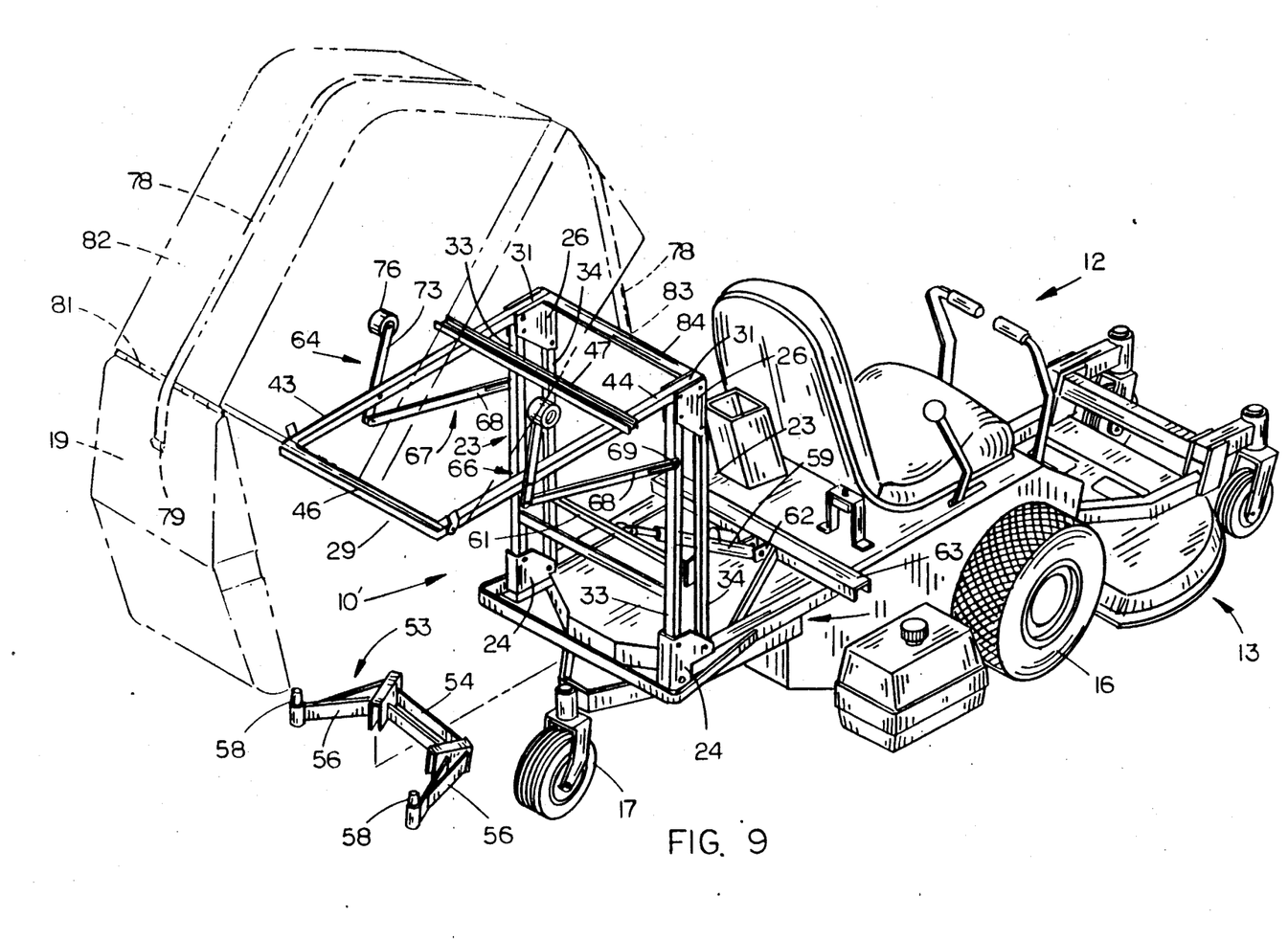
FIG. 9 is a perspective view of the second embodiment in its raised position.
Figure 10:
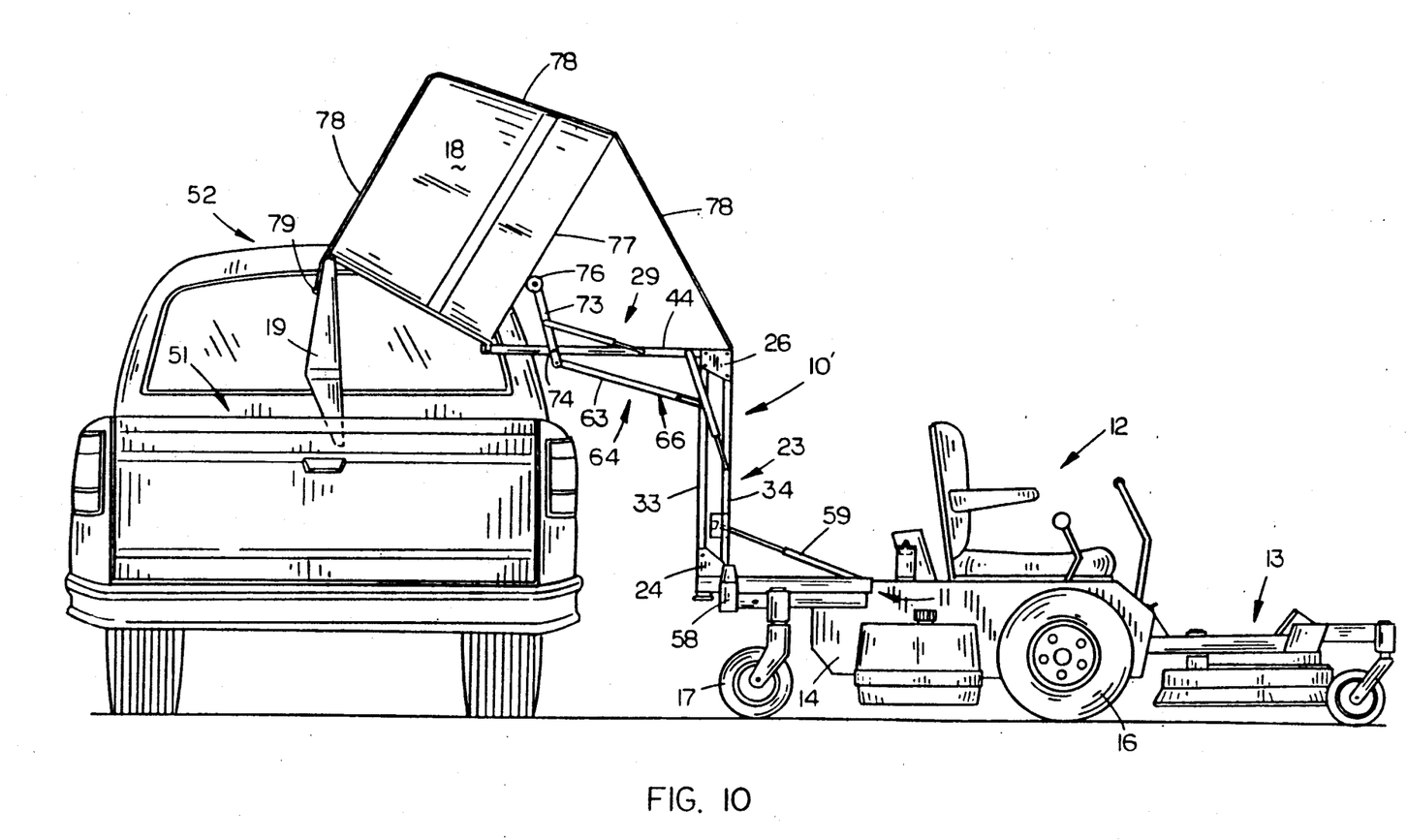
FIG. 10 is an enlarged side elevational view of another embodiment employing pneumatic springs for biasing the linkage mechanism.

The automated embodiment (10') includes further an assembly (64) (FIGS. 7 and 9) for automatically tilting the container upwardly and rearwardly to a dump or discharge position (FIG. 8). The assembly (64) comprises a pair of transversely spaced lift arm units (66), (67) and as they are identical only one (66) will be described. Unit (66) includes a first elongated arm (68) having a lost motion connection at (69) to an upper link (33), and which arm (68) is pivotally connected at its other end (71) to a common end (72) of a second arm (73). The latter arm (73) is pivotally connected intermediate its ends at (74) to an adjacent portion of a subframe unit arm (44) (FIG. 7), and is provided with a roller (76) secured to its free end for engagement with the undersurface (77) of the container.

By this arrangement (64), upon the mechanism (10') being in a nested position, the arms (68), (73) are folded together in a substantially parallel condition, but upon a raising of the linkage units (23) as shown in FIG. 7, the arms (68), (73) pivotally unfold and effect a counterclockwise rotation of the upper second arm (73), thus forcing and tilting the container (18) by the roller (76) upwardly and rearwardly about its pivotal connection (48) with the subframe unit (29). The container (18) is then in a position for discharging any material therein by opening the door (19).

The automation provided by the second embodiment (10') consists of a strap device (78) (FIGS. 8 and 9) secured at an outer end (79) to an upper portion of the door (19) with the remainder of the device (78) extended upwardly and rearwardly over the upper surface (82) of the container (18), and thence downwardly to a connection at (83) with a cross member (84) secured across the rear brackets (26). Although not shown, the connection (83) may be of any conventional strap or belt take-up device. It will be understood that in the FIG. 6 condition, the strap device (78) is extended at its shortest distance, and as the container (18) is automatically raised and tilted, the strap device (78) extends until it assumes a tautness which causes the door (19) to be automatically opened in a pivoting motion about its hinge (81).

It is to be noted that the present invention can be operated completely manually, completely automatically or any combination in between. For example, without the tilt assembly (64) one could manually lift and tilt the container (18) for dumping purposes; and without the strap device (78) one could manually open and close the door (19). The mechanism (10) or (10') still permits the container (18) to be manually tilted rearwardly in a down position. The mechanism (10) or (10') can be provided in any size and can be adapted for any riding mower or other vehicle having a rear frame similar to that shown. As mentioned hereinbefore, although a hydraulic device (59) is shown, either springs, a pneumatic strut or an electrically operated linear actuator may readily be substituted. One advantage of a linear actuator would be that it can be stopped at any position for varying the dumping height of the container (18). When used with a riding mower (12) of the type shown herein, the entire mechanism (10) or (10') can be raised with the rear frame (11) to service the mower mechanism therebelow.

Obviously, many modifications and variations of the present invention are possible in light of the above teachings. It is therefore to be understood that, within the scope of the appended claims, the invention may be practiced otherwise than as specifically described.

I claim:

1. In a portable unit having a generally horizontal frame, a container normally resting on a subframe and pivotally connected to the subframe for tilting upwardly and rearwardly with respect to the subframe and the container having a door at its rear for unloading material from the container, the improvement being a lift-and-tilt mechanism for moving the container comprising:

a linkage having opposed ends, one end pivotally connected to the frame; and the subframe supporting the container and having an inner end connected to the other end of said linkage, said subframe having an outer end pivotally connected to an outer end of the container whereby the container may be tilted with respect to the subframe;

wherein said linkage and said subframe are movable from a nested position substantially parallel to the frame to a raised position with said linkage disposed in a substantially vertical direction, and with said subframe disposed in a substantially horizontal direction in all positions;

and further wherein a lift arm is provided having one end connected to said linkage, an opposite end engageable with an underside of the container, and an intermediate portion pivotally connected to said subframe, whereby upon movement of said linkage toward said raised position, said lift arm automatically tilts the container upwardly and rearwardly toward a dump position.

2. The invention of claim 1, and further wherein a strap is provided interconnected between said linkage and said door and operable upon the upwardly and rearwardly tilting movement of the container to automatically pivotally open the door for dumping purposes.

3. A lift-and-tilt mechanism for a container on a vehicle having a generally horizontal frame, the container normally resting on a subframe of the lift-and-tilt mechanism and pivotally connected to the subframe for tilting upwardly and rearwardly therefrom, the container having a door at its rear for unloading material from the container, the lift-and-tilt mechanism comprising:

the subframe for supporting the container, said subframe including an arm extending in a generally horizontal plane, said arm having an inner end connected to a first bracket and having an outer end connected to the container whereby the container may be tilted with respect to the subframe; and a linkage including a pair of elongated parallel links pivotally connected at one of their ends to the first bracket and at the other of their ends to a second bracket mounted on the horizontal frame of the vehicle;

said first and second brackets each having holes for mounting the parallel links such that when the linkage and subframe are in a nested position, the parallel links and the arm of the subframe are located underneath the container and are parallel to the horizontal vehicle frame, and, when the linkage and subframe are in a raised position, the parallel links are transverse to the horizontal vehicle frame;

said linkage and said subframe being rotatable from the nested position to the raised position as the linkage is pivoted about the second bracket with the arm of the subframe maintained in a generally horizontal plane throughout the rotation.

4. The invention of claim 3, and further wherein said linkage includes an element selected from the group consisting of steel and pneumatic springs connected to said links for biasing said links in the nested position.

5. The invention of claim 3, and further wherein said subframe includes a pair of first brackets and a pair of parallel, longitudinally extended arms, said inner end of each of said arms being connected in a cantilever manner to said linkage by a respective first bracket.

6. The invention of claim 4, and further wherein said subframe includes a pair of first brackets and a pair of parallel, longitudinally extended arms, said inner end of each of said arms being connected in a cantilever manner to said linkage by a respective first bracket.

7. The invention of claim 3, and further wherein a power-operated element is connected between the vehicle frame and said subframe for moving said linkage from its nested, substantially horizontal position to the raised, substantially vertical position.

8. The invention of claim 6, and further wherein a power-operated element is connected between the vehicle frame and said subframe for moving said linkage means from its nested, substantially horizontal position to the raised, substantially vertical position.

9. The invention of claim 3, and further wherein a strap is provided interconnected between said linkage and said door and operable upon the upwardly and rearwardly tilting movement of the container to automatically pivotally open the door for dumping purposes.

10. The invention of claim 7, and further wherein a strap is provided interconnected between said linkage and said door and operable upon the upwardly and rearwardly tilting movement of the container to automatically pivotally open the door for dumping purposes.

11. The invention of claim 3, and further wherein a lift arm is provided having one end connected to said linkage, an opposite end engageable with an underside of the container, and an intermediate portion pivotally connected to said subframe, whereby upon movement of said linkage toward said raised position, said lift arm automatically tilts the container upwardly and rearwardly toward a dump position.

12. The invention of claim 11, and further wherein a strap is provided interconnected between said linkage and said door and operable upon the upwardly and rearwardly tilting movement of the container to automatically pivotally open the door for dumping purposes.

* * * * *